United States Patent [19]

Madonia

[11] 3,968,887

[45] July 13, 1976

[54] ARTICLE PICK-UP AND TRANSFER APPARATUS

[76] Inventor: Anthony F. Madonia, 19 Middlebury Lane, Buffalo, N.Y. 14216

[22] Filed: Sept. 18, 1972

[21] Appl. No.: 290,269

[52] U.S. Cl. ............................ 214/8.5 D; 214/1 BT; 294/65.5
[51] Int. Cl.² ........................................ B65G 59/04
[58] Field of Search ...................... 214/8.5 D, 1 BT; 294/65.5

[56] References Cited
UNITED STATES PATENTS

| | | | |
|---|---|---|---|
| 2,204,207 | 6/1940 | Coburn | 214/8.5 D |
| 2,682,625 | 6/1954 | Soreng et al. | 335/261 |
| 3,404,789 | 10/1968 | Georgeff | 214/8.5 D |
| 3,534,872 | 10/1970 | Roth | 214/8.5 C |
| 3,601,440 | 8/1971 | Evans | 294/65.5 |

*Primary Examiner*—Robert J. Spar
*Assistant Examiner*—George F. Abraham
*Attorney, Agent, or Firm*—Christel & Bean

[57] ABSTRACT

An article handling apparatus including a vertically reciprocable carriage provided with magnetic means for removing a single article from a stack of articles and delivering such article to an overhead conveyor which advances such article in a path normal to the path of movement of the carriage to a discharge station for removal from the conveyor upon demand.

8 Claims, 11 Drawing Figures

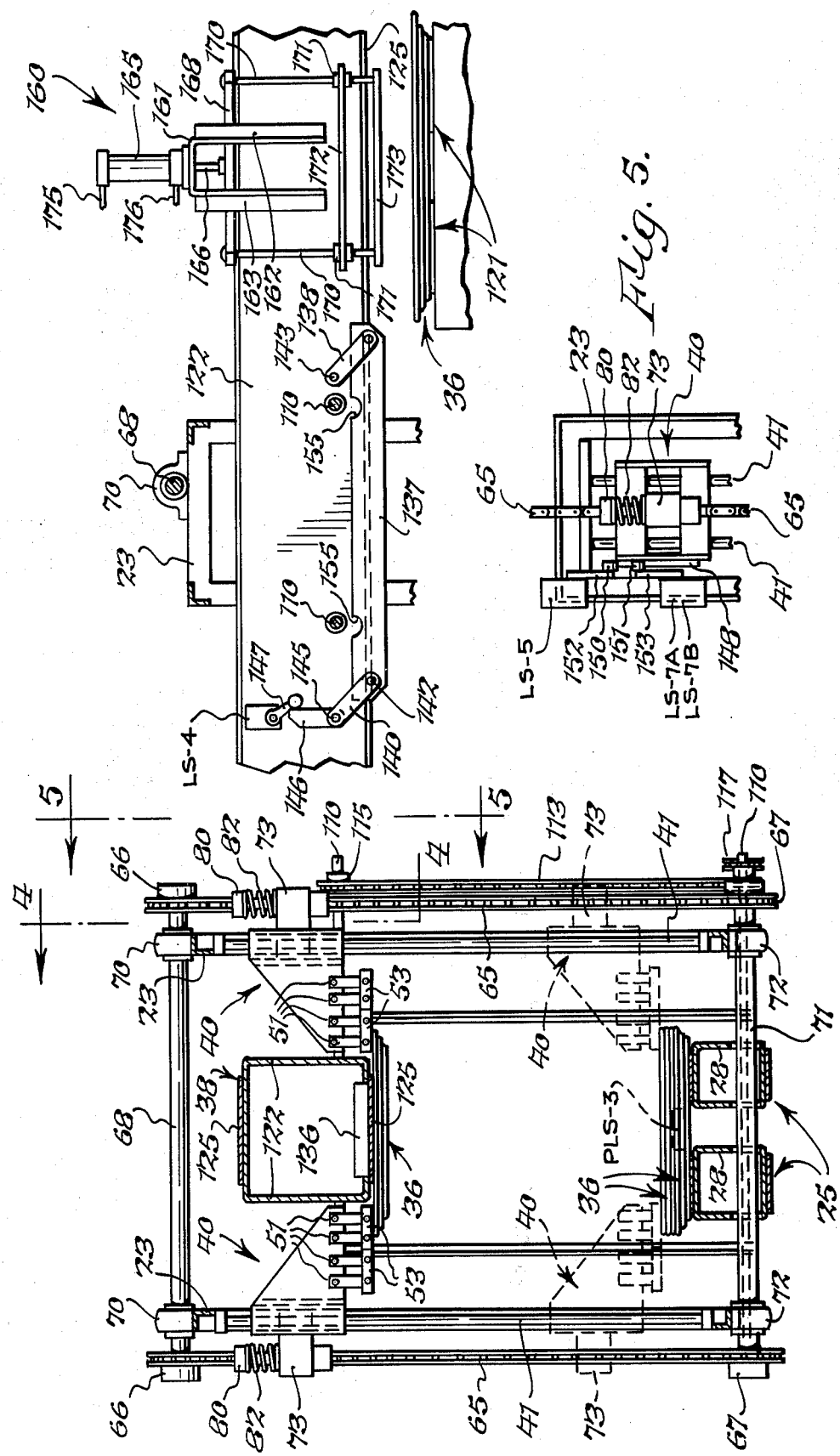

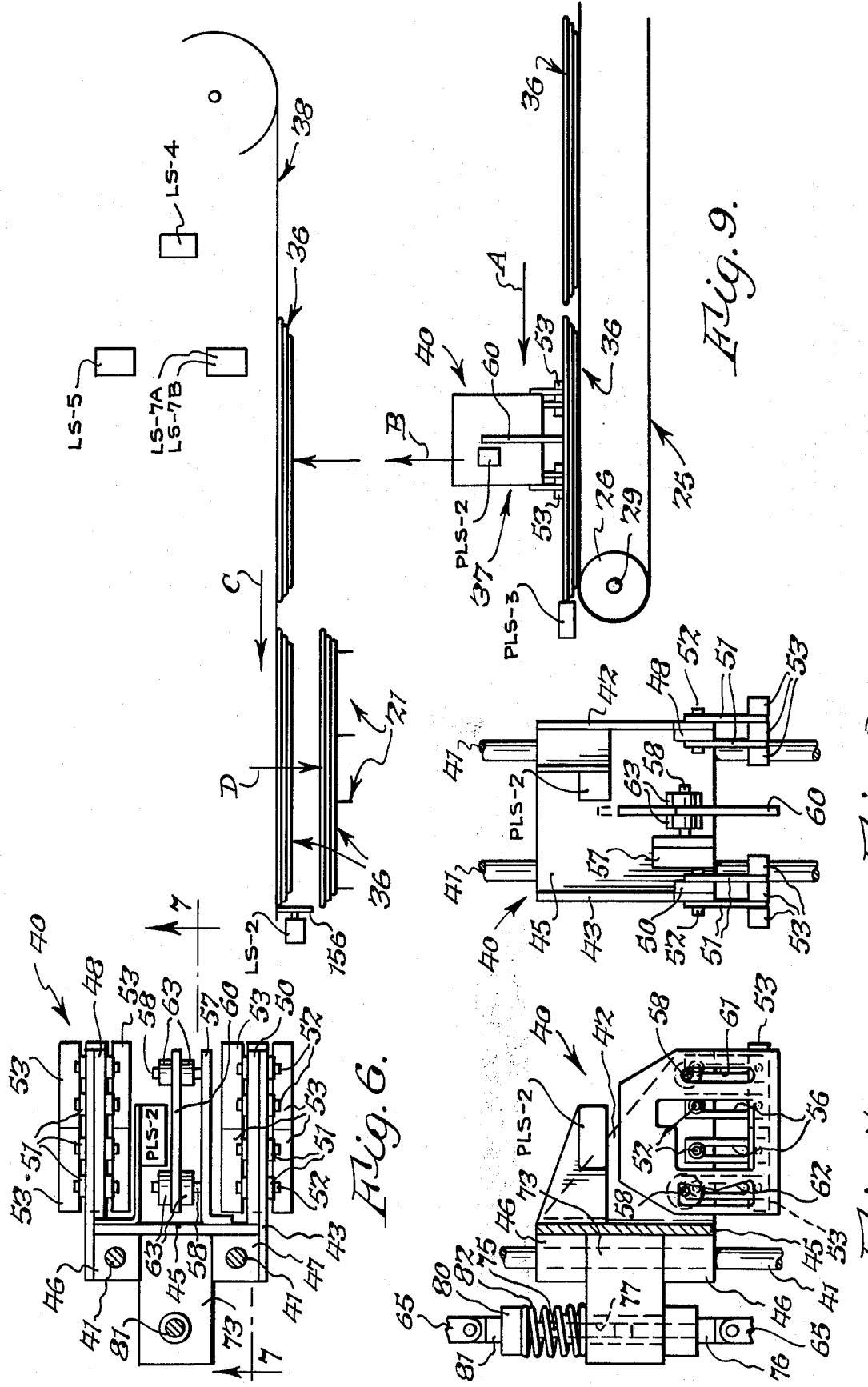

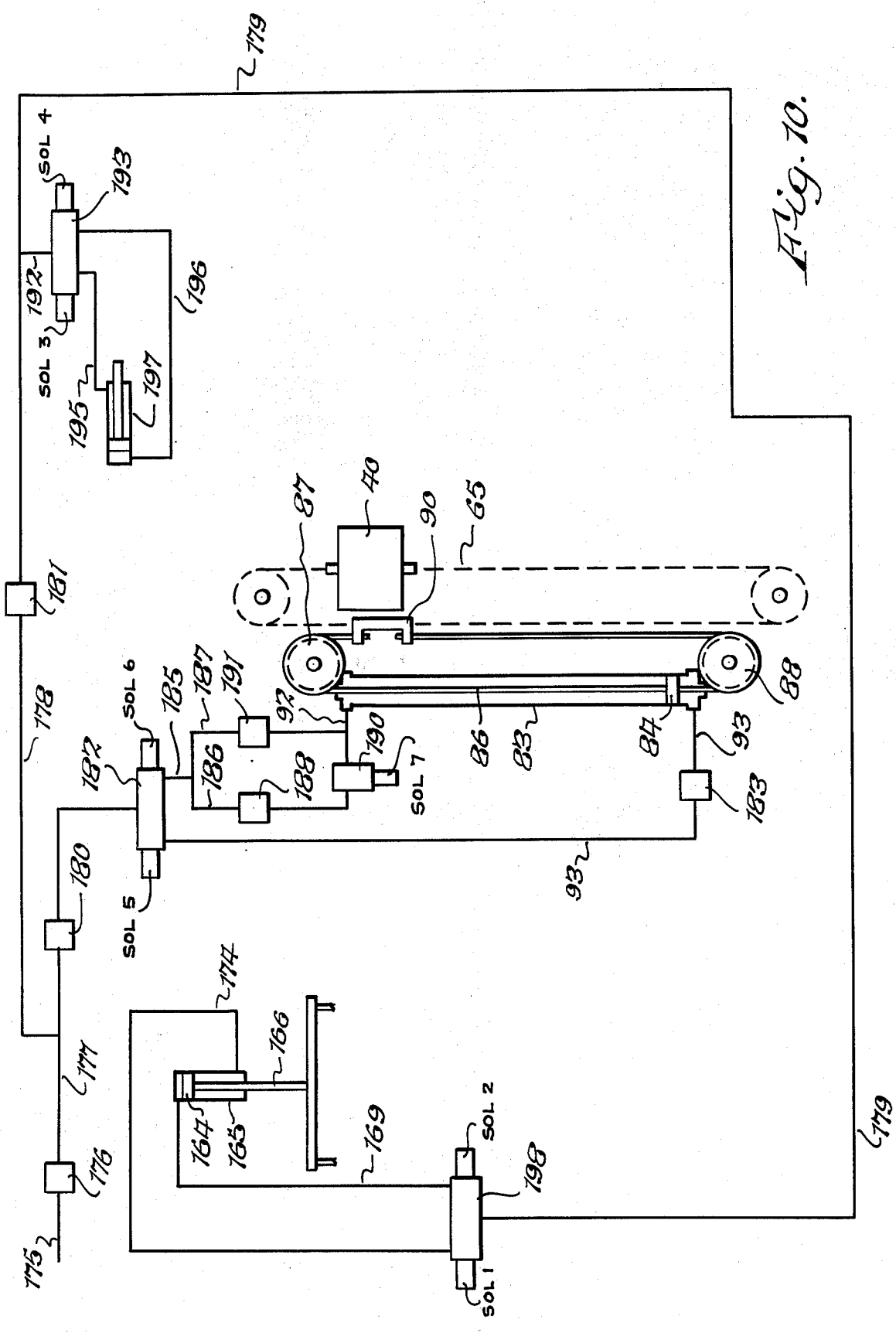

ARTICLE PICK-UP AND TRANSFER APPARATUS

BACKGROUND OF THE INVENTION

This invention relates generally to the article handling art and, more particularly, to an article pick-up and transfer assembly for delivering articles one at a time to an article feed conveyor.

Various machines have been devised for removing a single article from a group or stack of articles and delivering such articles one at a time to an automated feed conveyor so as to avoid the tedious and monotonous chore of manually placing articles on the feed conveyor as space is made available thereon. For example, in an automated baking operation, machines have been developed for removing a single baking pan or tray from a stack of trays and delivering such tray to an automatic tray feeding conveyor leading to a tray filling station. While such known machines have eliminated the labor forces otherwise required for manually feeding trays onto the automated conveyor system, they have not been entirely satisfactory. For example, these known devices employ a plurality of mechanical fingers engagable beneath the tray for lifting such trays one at a time from the stack. However, should one or more fingers become slightly misaligned, as often occurs during usage, or somewhat worn, they cannot perform their intended function properly and often pick up more than one tray or drop a tray while in transit. This, of course, interrupts not only the tray pick-up and transfer operation but also the subsequent operations of the automated tray feeding conveyor and operations downstream of the tray feeding conveyor.

SUMMARY OF THE INVENTION

The article pick-up and transfer assembly of the present invention, as hereinafter described, avoids the above problems by providing a simple, rugged and durable article pick-up and transfer assembly of general utility for efficiently and positively lifting a single article from a stack of articles and automatically delivering such single article to an output station upon demand.

The article pick-up and transfer assembly of this invention is characterized by the provision of a pair of vertically reciprocable carriages movable in unison, each having a plurality of substantially universally suspended magnets adapted to orient themselves for firm engagement with portions of variously configured articles for removing and lifting a single article from a stack of such articles upon movement of the carriages away from the stack. The article is lifted onto an overhead conveyor belt and held thereto by magnetic forces for delivery to a discharge station. A stripper, responsive to the demand for an article, is operative to strip the article from the conveyor belt onto an output station.

BRIEF DESCRIPTION OF THE DRAWINGS

FIG. 3 is a vertical sectional view, taken about on line 3—3 of FIG. 1;

FIG. 4 is a fragmentary rear elevational view, illustrating a portion of the tray conveyor frame;

FIG. 5 is a fragmentary side elevational view, looking in the direction of arrows 5—5 in FIG. 3;

FIG. 6 is a top plan view of a carriage forming a part of the present invention;

FIG. 7 is a vertical sectional view, taken about on line 7—7 of FIG. 6;

FIG. 8 is a rear elevational view of the carriage of FIG. 6;

FIG. 9 is a diagrammatic view of the path of travel of an article handled by the pick-up and transfer apparatus of this invention;

FIG. 10 is a schematic illustration of the pneumatic system incorporated in the apparatus of this invention.

DETAILED DESCRIPTION OF AN ILLUSTRATIVE EMBODIMENT

Figure 1:
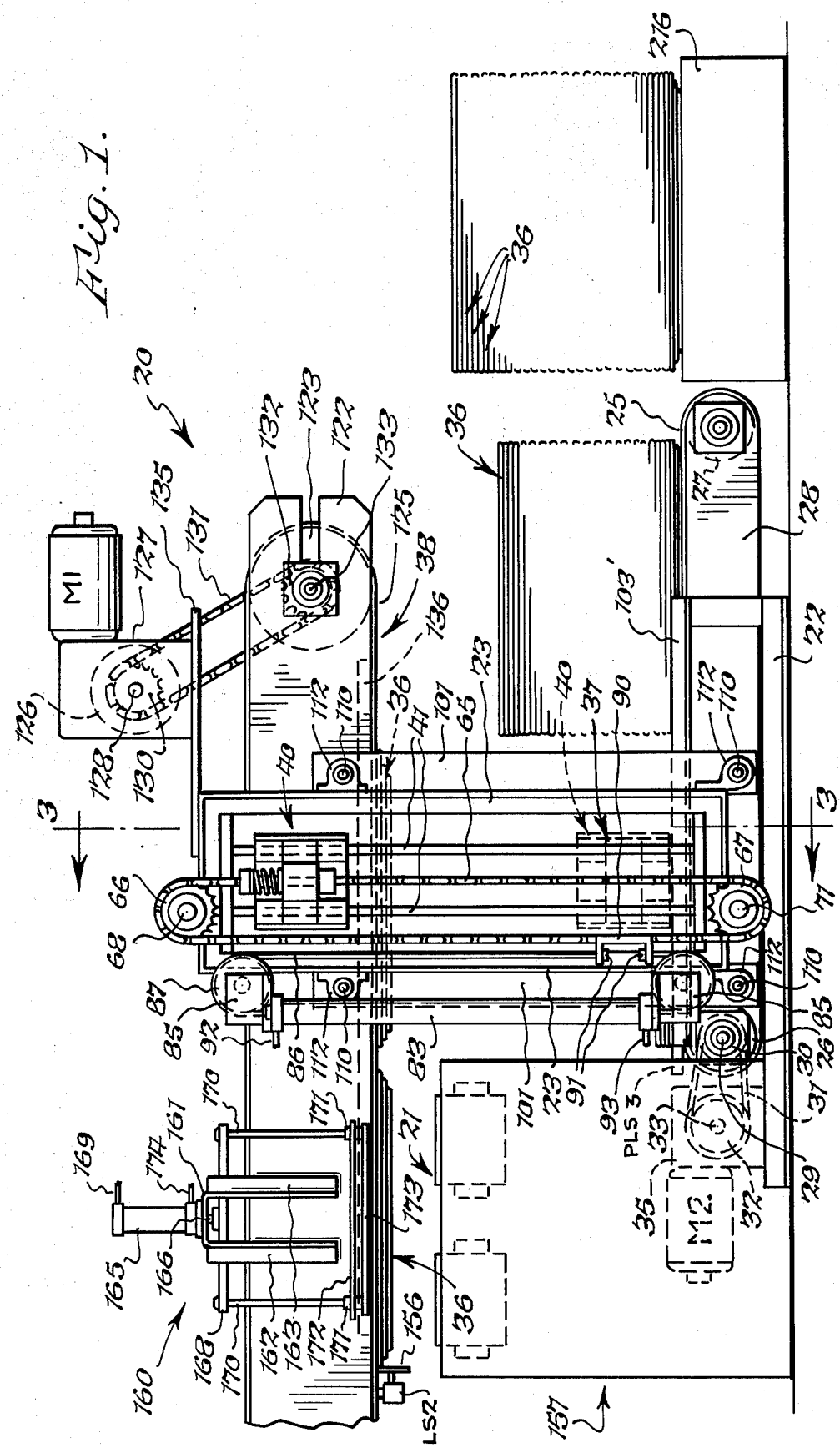
FIG. 1 is a front elevational view of an article pick-up and transfer assembly, constructed in accordance with this invention.

Referring now to the illustrative embodiment depicted in the accompanying drawings, there is shown in FIG. 1 an article pick-up and transfer assembly, generally designated 20, constructed in accordance with this invention. While the invention is in no way limited thereto, the article pick-up and transfer assembly 20 is especially adapted to pick up a single tray from a stack and transfer such tray to a desired station. In the illustrative embodiment, assembly 20 transfers the tray to a position overlying a tray feed conveying arrangement 21 so that the tray may be deposited on conveyor 21 when space is available thereon to receive the same. Transfer assembly 20 and conveyor 21 are incorporated in an automated bakery operation in which empty trays are fed along conveyor 21 to a tray filling station (not shown) wherein discrete portions of a dough mixture are deposited on the tray for ultimate conveyance to an oven to form rolls, buns, or other baking products.

Pick-up and transfer assembly 20 includes a base 22 suitably supported on a floor surface and an upstanding frame 23 rigidly secured to base 22. A pair of laterally spaced endless conveyor belts 25 are trained about a drive pulley 26 and an idler pulley 27 suitably journalled on a support 28 rigidly secured to base 22. Drive pulley 26 is rigidly mounted on a rotatable shaft 29 (FIG. 1) having a pulley 30 affixed thereto and about which a drive belt 31 is trained. Belt 31 also is guided about a drive pulley 32 rigidly secured to an output shaft 33 operatively connected to a drive motor M2 through a suitable gear reduction mechanism 35. Thus, motor M2 is effective to drive conveyor belts 25 in unison in a counterclockwise, endless orbital path to move a stack of trays 36 leftwardly, as viewed in FIG. 1, to a tray-pick up station 37.

Pick-up and transfer assembly 20 includes means for removing trays 36 one at a time from a stack of trays at pick-up station 37 and vertically raising such trays for presentation to a tray transfer conveyor, generally designated 38, for a purpose to be explained. Such means include a pair of laterally spaced, opposed carriages 40 (FIG. 3) vertically reciprocable together in synchronization on vertically extending, paired support rods 41 mounted at their opposite ends on frame 23. Both carriages 40 are identical in construction and operative in a similar manner, but oriented in an opposed relation. Accordingly, it is believed that a detailed description of only one carriage 40 will suffice, it being understood that the same reference characters will be applied to similar parts.

As best shown in FIGS. 6, 7 and 8, each carriage 40 comprises a pair of laterally spaced, upright plates 42 and 43 connected together by a cross plate 45 extending transversely therebetween. A pair of vertically spaced bearing blocks 45 and 47 are welded or otherwise fixedly secured to the rear side of cross plate 45 adjacent each opposite end thereof at the juncture of cross plate 45 with plates 42 and 43. These bearing blocks 46 and 47 are suitably bored for sliding movement on support rods 41. A pair of plates 48 and 50 are welded or otherwise fixedly secured to the inner faces of plates 42 and 43 adjacent the lower ends thereof and extend substantially lengthwise thereof. A plurality of links 51 are pivotally mounted at their upper ends to the outer faces of plates 42, 43, 48 and 50 by pins 52 projecting laterally outwardly therefrom. A plurality of permanent bar magnets 53 are pivotally mounted on the lower ends of links 51 by pins 55. As shown in FIGS. 7 and 8, two pairs of laterally spaced links 51 carry three magnets 53, two of the latter being attached to the outer sides of links 51 and the third magnet 53 mounted therebetween. Thus, a total of twelve magnets 53 are carried by each carriage 40 with six mounted on each side thereof. Of course, more or less than twelve magnets 53 can be carried by each carriage 40, depending on the configuration and size of the specific article being handled. Magnets 53 are effective to attach and lift a tray 36 from the stack of trays at pick-up station 37 and hold such tray thereto during upward vertical movement of carriage 40. Elongated slots 56 are provided in links 51 to permit relative movement between the latter and the plates to which they are mounted to provide tilting movement of bar magnets 53 in at least one plane. Also, some lateral play is provided between links 51 and their mounting plates. Thus, bar magnets 53 are generally universally suspended from plates 42, 43, 48 and 50 by virtue of the slot 56 and pin 52 arrangement together with the pivotal mounting of links 51 with their respective plates and with bar magnets 53, enabling the latter to be tilted upon engagement with variously configured trays. For example, should the left end portion of the left hand magnet 53 shown in FIG. 7 engage a high surface on tray 36 during the lowering of carriage 40 interrupting further downward movement of this left end portion, the associated pin 52 will move downwardly in slot 56 allowing the right end portion of magnet 53 to engage a lower surface on the tray to effect a stronger holding force thereon. Accordingly, the universal suspension of each set of three bar magnets 53 from plates 42, 43, 48 and 50 permits the handling of a wide variety of differently configured trays without necessitating any adjustments or the replacement of parts.

Since the height of the stack of trays at pick-up station 37 varies as trays 36 are singularly removed therefrom, means are provided on carriage 40 for sensing the uppermost tray 36 in order to effect termination of the downward movement of carriage 40 and initiate upward movement thereof. To this end, an angle member 57 is fixedly secured to crossplate 45 and has a pair of axially spaced shafts 58 projecting laterally outwardly therefrom. As best seen in FIG. 7, a sensing plate 60 is suspended on shafts 58 by means of at least two slots 61 and 62 in registry with shafts 58 for receiving the same, such slots being configured in a manner permitting vertical and tilting movement of plate 60 in the plane thereof relative to carriage 40. A pair of retaining collars 63 are mounted on each shaft 58 on opposite sides of plate 60 for restraining the latter against lateral movement.

Also mounted on carriage 40 by means of an angle member 65 is a proximity limit switch PLS-2 adapted to be actuated by the upper end of plate 60 when the latter is moved within a range in close proximity to switch PLS-2, as indicated in phantom in FIG. 8. As shown in FIGS. 7 and 8, the lower edge of plate 60 is normally disposed below the lower edges of bar magnets 53 and will engage the article to be lifted prior to engagement of the bar magnets 53 therewith upon the lowering of carriage 40. As a result, downward movement of plate 60 is arrested while switch PLS-2 continues to move downwardly with carriage 40 relative to plate 60. When switch PLS-2 moves to within a predetermined distance from the upper edge of plate 60, which is designed to occur at about the time bar magnets 53 engage the uppermost tray 36, switch PLS-2 is actuated to effect interruption of the downward movement of carriage 40, as will hereinafter be explained in connection with the electrical control system of this invention.

The means for vertically reciprocating carriage 40 in synchronism include a pair of drive chains 65, (FIGS. 1 and 3) each movable in an orbital path about a pair of vertically spaced sprockets 66 and 67. Upper sprockets 66 are mounted on a common, horizontally extending shaft 68 adjacent the opposite ends thereof, the shaft 68 being suitably journalled in axially spaced bearings 70 mounted on the upper end of frame 23. Likewise, the lower sprockets 67 are rigidly secured to a common, horizontally extending shaft 71 adjacent the opposite ends thereof, the shaft 71 being suitably journalled in axially spaced bearings 72 mounted on the lower end of frame 23. The mounting of sprockets 66 and 67 on common shafts 68 and 71 assures synchronous movement of chains 65.

Each carriage 40 is provided with a bracket 73 mounted between bearing blocks 46 and 47 (FIGS. 6 and 7) and projecting outwardly from cross plate 45 for connection to its associated drive chain 65. As shown in FIG. 7, each chain 65 is provided with a pair of connecting rods 75 and 76 threaded into the opposite ends of a tapped bore 77 extending vertically through bracket 73. Rod 75 can be threaded inwardly or outwardly of bore 77 to adjust the tension on chain 65 and is maintained in the adjusted condition by means of a nut 78. Rod 75 also is provided with a slidable collar 80 normally urged against a stop member 81 by a helical spring 82 mounted about rod 75 between bracket 73 and collar 80. Spring 82 serves as a shock absorber in cushioning the impact resulting from sudden starting and stoppage of drive chain 65.

The means for actuating drive chains 65 includes an elongated cylinder 83 (FIG. 1) extending vertically and mounted at its opposite ends to vertically spaced angle members 85 rigidly secured to frame 23. Cylinder 83 includes a piston 84 (FIG. 10) mounted for reciprocating movement within cylinder 83 and having a cable 86 anchored to the opposite sides of the piston. Cable 86 extends through opposite ends of cylinder 83 and is trained about pulleys 87 and 88 suitably journalled for rotation on structural members 85. The exposed portion of cable 86 is anchored to a channel shaped bracket 90 as shown at 91 in FIG. 1, the bracket 90 being rigidly secured to and extending outwardly from a portion of one of the drive chains 65. Conduits 92 and 93 are tapped into the opposite ends of cylinder 83 for alternately supplying or evacuating fluid pressure to and from the upper and lower ends of cylinder 83 for lowering and raising carriages 40 through the cable and chain connections. Thus, fluid pressure applied via conduit 91 to the top end of cylinder 83 moves the piston therein downwardly effecting an upward movement of the exposed cable 86 to drive chain 65 in a clockwise direction, as viewed in FIG. 1, and lower carriages 40. Of course, fluid pressure applied through conduit 93 to the opposite or lower end of cylinder 83 effects reverse or upward movement of carriage 40. The two chains 65 and consequently the two carriages 40 move together in the same direction through the common mounting of upper sprockets 66 on shaft 68 and lower sprockets 67 on shaft 71.

Figure 2:
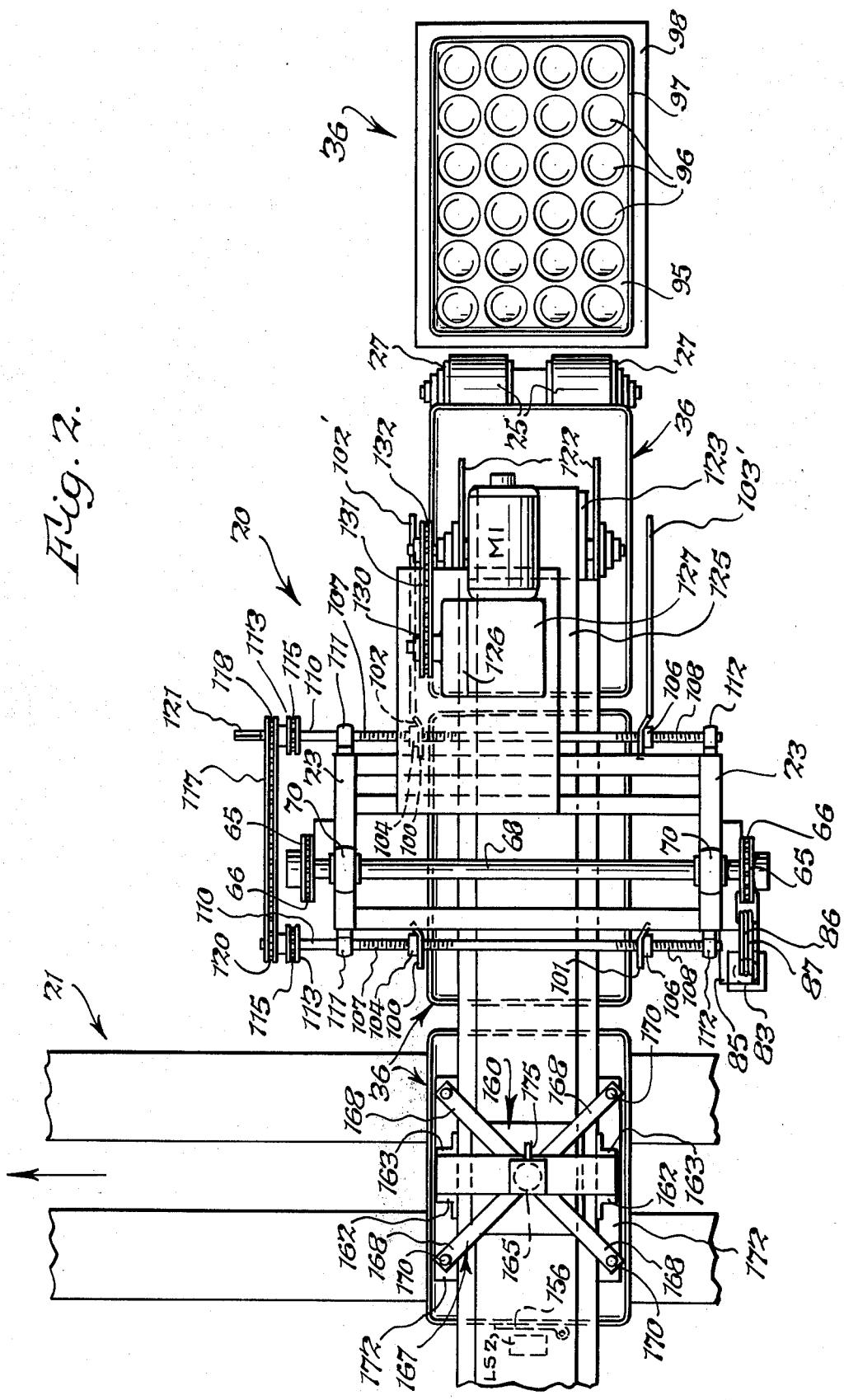
FIG. 2 is a top plan view of the apparatus of FIG. 1.

The specific articles being handled by the article pick-up and transfer assembly 20 of this invention are baking pans or trays 36 having a generally rectangular shape in plan, as shown in FIG. 2. Each tray 36 preferably is formed of a suitable metal covered with a coating of rust and corrosion resistant material and comprises a bottom wall 95 having a plurality of recessed cavities or pockets 96 for receiving dough portions ultimately baked to form buns, rolls and the like. Each tray 36 is provided with an inclined, peripheral wall 97 terminating at its upper end in a horizontally extending peripheral flange or rim 98. The configuration of trays 36 enables them to be conveniently stacked in an efficient nested relation, as shown in FIG. 1. It should be understood that the present invention is in no manner limited in use with the specific baking pans or trays illustrated, nor with baking pans or trays in general, but has utility in any article pick-up and transfer operation.

Means are provided for guiding the fresh stack of trays 36 on conveyor belts 25 into the proper position at pick-up station 37. Such means include two pairs of vertically extending guide plates 100 and 101 having the leading edges thereof flared outwardly, as at 102 and 103 in FIG. 1, to facilitate the passage of the stack of trays 36 therethrough. The lower ends of guide plates 100 and 101 are provided with extension bars 102' and 103' extending from the guide plate leading edges 102 and 103 toward the right end of conveyors 25. Extensions 102' and 103' serve as guide lines facilitating the proper placement of a stack of trays 36 on the right end of conveyors 25. Guide plates 100 and 101 are provided with laterally spaced nuts 104 and 106, respectively, fixedly attached thereto and threaded on the externally threaded portions 107 and 108 of a pair of vertically spaced shafts 110 passing through each pair of guide plates 100 and 101. Shafts 110 are suitably journalled adjacent their opposite ends in axially spaced bearings 111 and 112 mounted on frame 23 and fixed against axial movement. The threads on rod portions 107 are oppositely oriented from the threads on rod portions 108 so that rotation of shafts 110 effects axial movement of nuts 104 and 106 and thereby guide plates 100 and 101 toward and away from each other.

All four shafts 110 are connected together for rotation in unison by means of a pair of endless drive chains 113 trained about vertically spaced sprockets 115 and 116 rigidly secured adjacent the one end of each pair of upper and lower shafts 110. The lower shafts 110 also are connected together by an endless chain 117 trained about horizontally spaced sprockets 118 and 120. One of the upper shafts 110 is provided with a crank handle 121 for manually rotating such shaft 110 and effecting rotation of all the other shafts 110 in unison through the endless chain connections. Thus, the spacing between guide plates 100 and 101 can be readily adjusted to accommodate pans or trays 36 of various widths and sizes. As shown in FIG. 1, trays 36 extend across the widths of both conveyor belts 25 and normally project laterally beyond the opposite outer sides thereof.

The opposed carriages 40 function to remove a single tray 36 from the stack of trays at pick-up station 37 and deliver such tray to transfer conveyor 38 which in turn, is effective to transfer tray 36 to a position above the dual-belt, tray feed conveyor 21 and deposit the tray 36 on conveyor 21 when space is made available thereon. Transfer conveyor 38 includes a frame 122, of a generally box-like shape in cross section extending lengthwise between carriages 40 in their upper positions and having a drive pulley 123 mounted adjacent one end thereof and an idler pulley (not shown) mounted adjacent the other end thereof. An endless belt 125 is guided along the upper and lower sides of frams 122 and about drive pulley 123 and the idler pulley for movement in an endless orbital path in a clockwise direction, as viewed in FIG. 1. The means for driving belt 125 include a motor M1 operatively connected through a clutch 126 and a gear reduction mechanism 127 to an output shaft 128 for rotating the same. Shaft 128 is provided with a drive sprocket 130 rigidly secured thereto for driving an endless chain 131, also trained about a sprocket 132. Sprocket 132 is affixed to a shaft 133 to which drive pulley 123 is attached. Gear reduction mechanism 127 is mounted on a support plate 135 affixed to frame 23. Conveyor belt 125 is intermittently operated through the clutch arrangement 126 for a purpose hereinafter explained.

An elongated, permanent bar magnet 136 is mounted in conveyor frame 122 along the lower active run of conveyor belt 125 for the purpose of attracting and holding the metallic trays 36 thereto. As shown in FIG. 3, a tray 36 carried along the opposite sides thereof by carriages 40 is removed therefrom and deposited on the lower or active run of conveyor belt 125 as carriages 40 move upwardly relative thereto.

As tray 36 approaches the active run of conveyor belt 125 during its upward movement, it engages a bar 137 pivotally suspended from conveyor frame 122. As shown in FIG. 4, bar 137 is pivotally connected adjacent its opposite ends to the lower ends of a pair of links 138 and 140 as at 141 and 142. The upper end of link 138 is pivotally mounted at 143 to the rear side of conveyor frame 122 and link 140 is pivotally connected at 145 to the rear side of conveyor frame 122. Link 140 is provided with an extension to form a pivotable bell crank lever 146 normally engagable with the actuating lever 147 of a limit switch LS-4. The upward movement of bar 137 effected by the engagement of an upwardly moving tray 36 therewith causes bell crank lever 146 to swing in a counterclockwise direction about pivot 145 out of engagement with switch actuating lever 147 for a purpose hereinafter explained. Also, as carriages 40 approah their upper positions, a cam 148 (FIG. 5) mounted on the side of one of the carriages 40 engages a pair of cam followers 150 and 151 connected to the actuating levers 152 and 153 of a limit switch LS-5 and a pair of limit switches LS-7A, LS-7B, respectively, for energizing the same for a purpose hereinafter explained in connection with the operation of the apparatus of this invention. A pair of semi-circular grooves 155 are formed in the upper surface of bar 137 to prevent interference thereof with shafts 110 projecting transversely through conveyor frame 122.

Actuation of conveyor belt 125 in a clockwise direction moves tray 36 toward the left as viewed in FIG. 1. As tray 36 moves leftwardly the leading edge thereof engages a lever 156 to actuate limit switch LS-2 and effect stoppage of conveyor belt 125, as will hereinafter become apparent, positioning tray 36 in overlying relation to the output station or tray feed conveyor 21. Conveyor 21 forms a part of an automated pan or tray feeding system, generally designated 157, which continuously feeds tray 36 in a closely spaced relation to a dough filling station for ultimate delivery to a baking oven. The efficient and automatic dough filling operation is dependent on a continuous supply of trays 36. Accordingly, the system 157 is provided with an electrical control circuit (not shown) to operate the system in a properly timed relation. In an effort to continuously supply trays 36, means are incorporated in the system's control circuit to ascertain when space is available on conveyor 21 for another tray 36. Other means included in the control circuitry of this invention is responsive to this demand to initiate operation of a stripping means, generally designated 160, for stripping a tray 36 from conveyor belt 125 onto the available space on tray feed conveyor 21.

In accordance with this invention, stripping means 160 (FIGS. 4 and 5) comprises a support plate 161 overlying conveyor frame 122 in spaced relation thereto and extending transversely thereof. A pair of vertically depending angle members 162 and 163 are secured adjacent each opposite end of support plate 161 along the opposite edges thereof and are welded or otherwise fixedly secured to the opposite sides of conveyor frame 122. A fluid cylinder 165 is mounted on the central portion of support plate 161 and is provided with a piston 164 having a piston rod 166 secured thereto. The lower end of piston rod 166 is rigidly secured to a pusher member 167 of generally X shaped configuration in plan (FIG. 2) having four legs 168, each of which is provided with a rod 170 extending downwardly from the distal end thereof. Rods 170 extend through guide bushings 171 mounted in spaced stationary bars 172 secured to the opposite sides of conveyor frame 122. The distal ends of rods 170 are attached to spaced pusher bars 173 disposed below stationary bars 172 and movable along the sides of conveyor frame 122 for engagement with tray 36 carried by the conveyor belt 125. Conduits 160 and 174 are tapped into the head and rod end of cylinder 165, respectively, for alternately supplying or evacuating air pressure to and from the head and rod end of cylinder 165 to lower and raise piston rod 166. Lowering of piston rod 166 moves pusher bars 173 into engagement with the sides of tray 36 on conveyor belt 125 and strips such tray therefrom into tray feed conveyor 21.

Referring now to the diagrammatic showing of the fluid pressure system, preferably pneumatic, in FIG. 10, there is shown a main line air pressure supply conduit 175 connected to a suitable source (not shown) and passing through a suitable filter 176. Conduit 175 is divided into two pressure supply branch conduits 177 and 178 having suitable pressure regulators 180 and 181 therein. Conduit 177 leads to a two-position directional control valve 182 having a spool valve (not shown) therein, the position of which is controlled by a solenoid SOL No. 5 and a solenoid No. 6. One of the outlets of directional valve 182 is connected by conduit 93 to the lower end of cylinder 83 below piston 84. An adjustable flow control valve 183 is provided in conduit 93 for regulating the flow of air pressure therethrough. The other outlet of directional valve 182 is connected to a conduit 185 having a pair of branch conduits 186 and 187 leading to conduit 92 connected to the upper end of cylinder 83 above piston 84. An adjustable flow control valve 188 is provided in conduit 186 for regulating the flow of air pressure therthrough. Also provided in conduit 186 is a two-position normally open control valve 190 having a spool valve therein shiftable to restrict the flow of air pressure therein, the position of the spool valve being controlled by a solenoid SOL No. 7. An on-off control valve 191 provided in conduit 187 is operative for by passing air flow directly through conduit 187 into and from cylinder 83.

Branch conduit 178 is further branched off into a conduit 170 and a conduit 192, the latter leading to a two-position directional control valve 193 having a spool valve therein, the position of which is controlled by a pair of solenoids SOL No. 3 and SOL No. 4. Leading from directional control valve 193 are a pair of conduits 195 and 196 connected to the upper and lower sides of a cylinder 197 above and below the piston therein which is operatively connected to clutch 126.

The branch conduit 179 is connected to a two-position directional control valve 198 shiftable into opposite directions for admitting and/or exhausting air pressure into either conduit 169 or conduit 174 connected to the upper and lower ends, respectively, of stripping cylinder 165 above and below piston 164. Directional valve 198 is shifted into opposite directions by a pair of solenoids SOL No. 1 and SOL No. 2.

Figure 11:
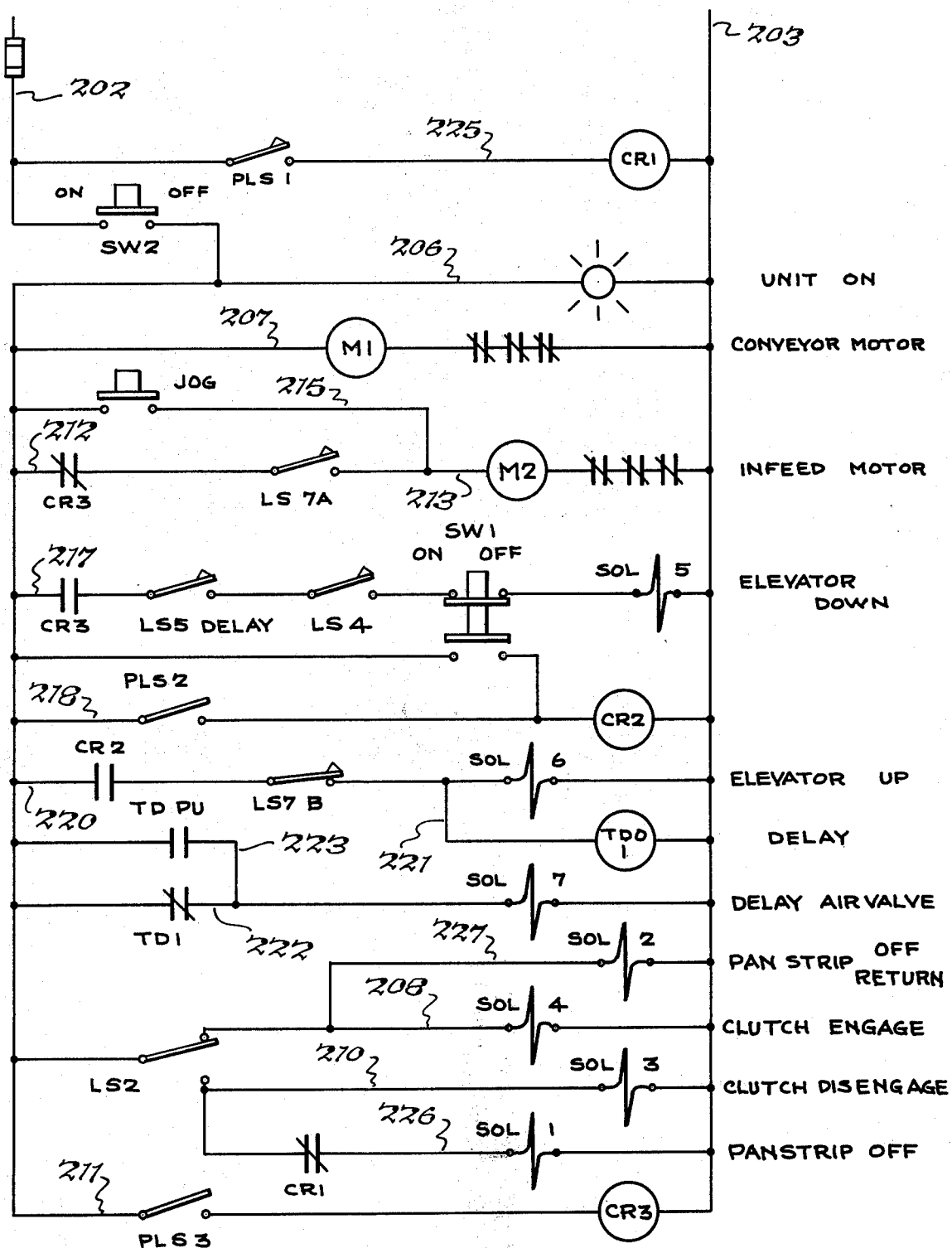
FIG. 11 is a diagrammatic illustration of an electrical control circuit for use with the apparatus of this invention.

The various movements and sequential operation of the article pick-up and transfer assembly 20 described above, which afford continuous automatic operation of the machine, are the function of a comprehensive electrical control system, diagrammatically illustrated in FIG. 11. All of the electrical switch elements are associated with and activated by the movable elements of apparatus 20 except for the operation of switch PLS-1 which is effected by the demand for a tray on tray feed conveyor 21 of the automated tray feeding system 157. The electrical control system will be described in connection with the operation of apparatus 20. In describing the operation of apparatus 20, let it be assumed that a tray 36 is positioned on the right side of the active run of conveyor belt 125 at the upper end of pick-up station 37 and that there is no tray 36 on the left side of conveyor belt 125 beneath the stripping means 160. Also, assume that the stack of trays normally located on conveyor belts 25 at pick-up station 37 has been depleted and that there is a fresh stack of trays 36 on the right side of conveyor belts 25. Under these conditions, limit switch LS-4 is in an open position and switch LS-2 is in the position shown in FIG. 11. With carriages 40 in their upper positions, switches LS-5 and LS-7A are closed and switch LS-7B is open.

Referring now to the electrical system, illustrated diagrammatically in FIG. 11, operating current is tapped from the electrical system of the automated tray feeding system 157, which is connected to a suitable power source (not shown), the current being supplied through a power line comprising conductors 202 and 203. In operation, the on-off main power switch SW2 is depressed and maintained closed to supply operating current to conductor 205. An indicator lamp P in lead 206 is illuminated to indicate that power for the electrical control system is on. Also, a circuit is completed via conductor 205, lead 207 and conductor 203 for energizing drive motor M1. Also, switch LS-2 is in a position maintaining solenoid SOL No. 4 energized via conductor 205, switch LS-2, lead 208, solenoid SOL No. 4 and conductor 203 to maintain directional valve 193 in a position supplying air pressure to the top of cylinder 197 via conduit 195 to maintain clutch 126 engaged.

Energization of drive motor M1 drives conveyor belt 125 in a clockwise direction moving tray 36 leftwardly. As tray 36 rides off bar 137, the latter is lowered by gravity, rotating bellcrank 146 (FIG. 4) about pivot 145 into engagement with lever 147 for actuating the same to close the previously opened limit switch LS-4 in readiness for the carriage lowering operation. Tray 36 continues to move leftwardly on conveyor belt 125 until it engages lever 156 of limit switch LS-2 to actuate the latter into its alternate position, completing a circuit via conductor 205, switch LS-2, lead 210, solenoid SOL No. 3 and conductor 203 to energize solenoid SOL No. 3. Energization of solenoid SOL No. 3 shifts directional valve 193 to a position admitting air pressure into the rod end of cylinder 197 via conduit 196 to lift the piston therein and thereby disengage clutch 126 to effect stoppage of conveyor belt 125.

Also, in the absence of trays 36 at the pick-up station 37, proximity switch PLS-2 in lead 211 is opened and with carriages 40 in their upper positions, switch LS7-A is closed to energize motor M2 via conductor 205, lead 212, normally closed contacts CR3, switch LS7-A, lead 213 and conductor 203. Energization of motor M2 drives conveyor belts 25 in unison in a counterclockwise direction to move the fresh stack of trays 36 on the right side of conveyor belts 25 to the pick-up station 37. Limit swtich LS-7A, which is cammed closed by cam 148 when carriages 40 are in their upper positions, provides a fail safe feature in preventing energization of motor M2 and the advancement of a stack of trays 36 into pick-up station 37 unless carriages 40 are in their upper positions out of the path of movement of the advancing stack of trays 36.

As the lowermost tray 36 on conveyor belts 25 approaches proximity switch PLS-3, the latter closes to complete a circuit via conductor 205, lead 211, switch PLS-3 and conductor 203 to energize control relay CR3. Energization of control relay CR3 opens the normally closed contacts CR3 in lead 212 and interrupts the circuit to motor M2 causing conveyor belts 25 to stop. Switch PLS-3 remains closed as long as at least one tray 36 is disposed on conveyor belts 25 at pick-up station 37. Motor M2 also can be energized by depressing switch JOG in lead 215 to bypass the above described automatic operation for advancing conveyor belts 25. A fresh stack of trays 36 on a loading support 216 (FIG. 1) adjacent conveyor belts 25 can be placed on the right side of belts 25 in readiness for the next tray advancing operation.

Energization of control relay CR3 also closes normally open contacts CR3 in lead 217 to complete a circuit via conductor 205, lead 217, contacts CR3, switches LS-5 and LS-4, switch SW1 when in its raised position as shown in FIG. 11, solenoid SOL No. 5 and conductor 181 to effect energization of solenoid SOL No. 5. Energization of SOL No. 5 shifts directional control valve 182 into a position directing fluid pressure into cylinder 83 (FIG. 1) via conduits 185, 186 and 92 to move piston 84 downwardly and effect upward movement of the exposed portion of cable 86 and clockwise movement of chain 65 to lower carriages 40. As cam followers 150 and 151 (FIG. 5) ride off can 148 during the lowering of carriages 40, their respective levers 152 and 153 are actuated to open delay limit switch LS-5 and limit switch LS7-A and close limit switch LS7B. Thus solenoid SOL No. 5 is deenergized and the circuit to motor M2 is interrupted to prevent advance of conveyor 25 during the lowering of carriages 40. As carriages 40 approach the stack of trays 36 at pick-up station 37, sensing plate 60 (FIGS. 6 and 7) engages the uppermost tray 36 prior to engagement thereof by bar magnets 53, causing the upper edge of plate 60 to be held stationary relative to the descending proximity switch PLS-2. At about the time that bar magnets 53 engage the uppermost tray 36, the upper edge of plate 60 will be within the operating range of switch PLS-2 to actuate the latter to a closed position completing a circuit for control relay CR2 via conductor 205, lead 218, swtich PLS-2, control relay CR2 and conductor 203 to energize relay CR2. Energization of control relay CR2 closes normally open contacts CR2 in lead 220 to energize solenoid SOL No. 6 via conductor 205, lead 220, contacts CR2, switch LS7-B and conductor 203. Also, a time delay relay TD01 in lead 221 is energized to open normally closed contacts TD1 in lead 222, deenergizing solenoid SOL No. 7. Also, the energization of time delay relay TD01 is effective to close normally open contacts TDPU in lead 223 after a predetermined time delay to effect reenergization of solenoid SOL No. 7.

Because of the substantially universal suspension of bar magnets 53 in at least one plane, they orient themselves in a manner to make optimum contact with the upper surface of the uppermost tray 36 when carriages 40 are in their lower pick up positions regardless of the specific shape or configuration of such tray 36 to firmly engage and hold the same by virtue of the magnetic forces therein.

Energization of solenoid SOL No. 6 shifts directional valve 182 into an opposite position evacuating the upper end of cylinder 83 via conduit 92 and directing fluid pressure into the bottom end of cylinder 83 via conduit 93 to effect downward movement of the exposed portion of cable 86 and counterclockwise movement of chain 65 to raise carriages 40 and lift the uppermost tray 36 from the stack of trays at pick-up station 37. However, the deenergization of SOL No. 7 is effective to shift control valve 190 into a position restricting return flow of air pressure from the upper end of cylinder 83 through conduit 92 so that carriages 40 initially ascend at a relatively slow rate of speed to prevent disengagement of bar magnets 53 from tray 36 and to facilitate the gradual and smooth lifting of the uppermost tray 36. After a time delay, contacts TDPU in lead 223 close to effect energization of solenoid SOL No. 7 to shift control valve 190 to a fully open position to effect unrestricted flow of fluid pressure from the top of cylinder 83 and rapid movement of carriages 40 toward their upper positions. When time delay relay TD01 times out, contacts TDPU open and contacts TD1 in lead 222 revert to their normally closed positions to maintain solenoid SOL No. 7 energized, thereby permitting unrestricted flow through control valve 190 during a subsequent carriage lowering operation. The bar magnets 53 are operative to carry the uppermost tray 36 therewith upon the elevation of carriages 40 and convey such tray 36 to conveyor belt 125, the tray being attracted to and held on conveyor belt 125 by the magnetic forces of bar magnet 136 in conveyor frame 122.

As carriages 40 reach the end of their upper strokes, cam 148 (FIG. 5) engages cam follower 150, actuating the associated lever 152 to close time delay limit switch LS-5 in lead 217 after a predetermined time delay to prepare the associated circuit for a subsequent carriage lowering cycle. Also, cam 148 engages cam follower 151 actuating the associated lever 153 to close switch LS7A in lead 212 and to open limit switch LS7-B in lead 220 to lock out the carriage lifting circuit in the event plate 60 would tend to continue to move upwardly upon the stoppage of carriages 40 at the end of their upward strokes and inadvertently actuate proximity limit switch PLS-2. After plate 60 has stabilized relative to carriage 40, and time delay switch LS-5 times out, it closes in readiness for the next carriage lowering cycle.

As tray 36 approaches conveyor belt 125, it engages bar 137 causing bellcrank 146 to pivot in a counter-clockwise direction allowing lever 147 to swing to actuate limit switch LS-4 in line 217 into an open position interrupting the circuit for solenoid SOL No. 5 and preventing the lowering of carriages 40 until tray 36 is conveyed off bar 137.

In the sequence of operations thus far described, a pair of axially spaced trays 36 are held on the active run of conveyor bell 125 as shown in solid line and in phantom in FIG. 1. In the meantime, a tray 36 on the tray feeding conveyor 21 is advancing from beneath stripping means 160 to an output station (not shown) and is maintaining proximity switch PLS-1 in line 225 in a closed position, maintaining control relay CR1 energized via conductor 202, line 225, switch PLS-1 and conductor 203. Energization of control relay CR1 opens the normally closed contacts CR1 in line 226 to prevent energization of solenoid SOL No. 1 and actuation of the stripping means 160 until tray 36 on conveyor 21 advances past switch PLS-1 indicating that the tray has advanced sufficiently to provide space for the reception of another tray 38. As tray 36 on conveyor 21 moves past switch PLS-1, it opens to deenergize control relay CR1 and allow contacts CR1 in line 226 to revert to their normally closed positions. The closing of contacts CR1 completes a circuit via conductor 205, switch LS-2, contacts CR1, line 226, solenoid SOL No. 1 and conductor 203 to enrgize solenoid SOL No. 1.

Energization of solenoid SOL No. 1 effects shifting of directional valve 198 (FIG. 10) for directing air under pressure into cylinder 165 via conduit 169 to move piston 164 and piston rod 166 downwardly, driving pusher bars 173 against tray 36 to strip the latter from conveyor belt 125 and onto tray feed conveyor 21. Thus, stripping means 160 is responsive to the demand for a tray 36 at the output station on conveyor 21 of system 157. The disengagement of the leading tray 36 from actuating lever 156 of limit switch LS-2 causes the latter to be shifted to its alternate position shown in FIG. 11, deenergizing solenoids SOL No. 1 and SOL No. 3 and energizing solenoids SOL No. 2 and SOL No. 4 via leads 227 and 208, respectively.

Energization of solenoid SOL No. 2 is effective to shift the directional valve 198 to a position directing air pressure into the rod end of cylinder 165 via conduit 174 for raising piston 164 and piston rod 166 and the associated pusher bars 173 upwardly out of the path of a subsequently delivered tray 36.

Energization of solenoid SOL No. 4 effects shifting of directional valve 193 into a position directing air pressure into cylinder 197 via conduit 192 to effect engagement of clutch 126 to initiate movement of conveyor belt 125 in a clockwise direction moving tray 36 from station 37 to the tray stripping station beneath stripping means 160. As the advancing tray 36 leaves bar 137, the latter is lowered by gravity, rotating bellcrank 146 (FIG. 4) about pivot 145 into engagement with lever 147 for actuating the latter to close limit switch LS-4 and condition the carriage lowering circuit for another cycle. Since contacts CR3 are held closed by the continued energization of control relay CR3 and limit switch LS-5 was previously closed upon the ascension of carriages 40, the carriage lowering circuit is completed for lowering carriages 40 as hereinbefore described to remove another tray 36 from the stack of trays at station 37 and deliver the same to conveyor belt 125. When the preceding advancing tray 36 on conveyor belt 125 reaches the stripping station, it engages lever 156 to shift limit switch LS-2 to its alternate position deenergizing solenoids SOL No. 2 and SOL No. 4 and energizing solenoid SOL No. 3 to disengage clutch 126 and terminate movement of conveyor belt 125. Meanwhile, the advancing tray 36 on conveyor 21 depresses switch PLS-1 to energize control relay CR1 in lead 225 to open normally closed contacts CR1 in line 226 and prevent energization of solenoid SOL No. 1 and the actuation of stripping means 160 upon the movement of switch LS-2 to its alternate position. Apparatus 20 is now conditioned for another cycle of operation, as dictated by the demand for another tray 36 on conveyor 21.

Referring now to FIG. 1 and the schematic illustration of FIG. 9, the operation of the article pick-up and transfer assembly 20 of this invention can be summarized as follows:

When the stack of trays normally disposed on the left end of conveyor belts 25 at pick-up station 37 is depleted, switch PLS-3 is activated to effect movement of such belts 25 in the direction of arrow A (FIG. 9) to move a fresh stack of trays 36 into the pick-up station and deactivate switch PLS-3 to stop conveyor 25. An interlock feature incorporated in the electric circuitry is effective to prevent lowering of carriages 40 when conveyor 25 is operating.

With no trays on conveyor belt 125, carriages 40 are lowered in unison to bring their associated bar magnets 53 into engagement with the uppermost tray on the stack of trays 36 disposed therebeneath. Through actuation of proximity switch PLS-2, the electric control circuitry is operative to effect upward movement of carriages 40 in unison in the direction of arrow B at an initial slow rate of speed to prevent disengagement of the tray 36 from magnets 53, followed by a rapid upward movement thereof to present the tray to conveyor belt 125.

Conveyor belt 125 advances the tray 36 in the direction of arrow C to the discharge station below the stripping means 160. As the tray 36 reaches the discharge station, it engages switch LS-2 to effect stoppage of conveyor belt 125. Also, until the tray 36 on belt 125 is conveyed out of the path of movement of carriages 40, an electrical interlock precludes lowering of the carriages 40. When the tray 36 is advanced a predetermined distance, carriages 40 are operable to lift another tray 36 from the stack of trays at station 37 and present the same to conveyor belt 125.

With two trays supported on conveyor belt 125, apparatus 20 remains at a standstill until demand is made for a tray at the output station on conveyor 21. When the system 157 demands a tray, the stripping means 160 becomes operative to strip a tray 36 from conveyor belt 125 in the direction of arrow D onto conveyor 21. The hereinbefore described cycle of transferring a tray to the discharge station and lifting a single tray from the stack and delivering the same to conveyor belt 125 is repeated.

As a result of the present invention, an article pick-up and transfer assembly is provided for removing a single article from a stack of such articles and delivering the single article to a conveyor for transfer to a discharge station whereat the article is expelled upon demand. The provision of magnetic pick-up and holding means, which are self-orienting for positive engagement with variously configurated articles, assures the removal of a single article only from the stack for subsequent handling.

A preferred form of this invention having been disclosed in detail, it is to be understood that this has been done by way of illustration only.

I claim:

1. An article transfer apparatus comprising: an upright frame, means for supporting a stack of articles adjacent the lower end of said frame, a plurality of upright support rods rigidly secured to said frame, carriage means vertically slidable on said rods and disposed in vertical registry with said article supporting means, means for moving said carriage means toward and away from said article supporting means, said carriage means including support plates, a plurality of elongated rigid members suspended from said support plates, at least one permanent magnet mounted on the lower end of each of said rigid members, each magnet being pivotally mounted at spaced locations thereon to two of said rigid members, means mounting said rigid members on said plates for pivotal movement and bodily vertical displacement relative to said support plates whereby said magnets are self-orienting upon engagement thereof with an irregularly shaped article on said stack, said rigid member mounting means comprising pins projecting outwardly from said support plates, each of said rigid members having an elongated slot for receiving a corresponding one of said pins and being suspended thereby, each of said pins being movable along the slot in the corresponding one of said rigid members to allow said vertical displacement, said vertical displacement in conjunction with said spaced pivotal mounting of said magnets allowing tilting movement of said magnets substantially in a vertical plane, means for sensing the proximity of said magnets relative to said article upon downward movement of said carriage means, and control means reponsive to said sensing means for interrupting downward movement of said carriage means upon engagement of said magnetic means with said article and initiating upward movement of said carriage means to lift said magnets and remove a single article from said stack.

2. A transfer apparatus according to claim 1 wherein said carriage means comprises a pair of opposed carriages vertically reciprocable in unison on said upright support rods and each comprising said support plates, said rigid members and said permanent magnets.

3. An article transfer apparatus comprising: an upright frams, means for supporting a stack of articles adjacent the lower end of said frame, a plurality of upright support rods rigidly secured to said frame, carriage means vertically slidable on said rods and disposed in vertical registry with said article supporting means, said carriage means comprising a pair of opposed carriages vertically reciprocable in unison on said upright support rods, means for moving said carriage means toward and away from said article supporting means, said moving means comprising a pair of drive chains each connected to one of said carriages and movable in an orbital path about a pair of sprockets, means connecting said sprockets for synchronous rotation, and power means for actuating said drive chains, each of said carriages including support plates, a plurality of rigid members suspended from said support plates, at least one permanent magnet mounted on the lower end of each of said rigid members, means mounting said rigid members on said plates for pivotal movement and bodily vertical displacement relative to said support plates whereby said magnets are self-orienting upon engagement thereof with an irregularly shaped article on said stack, means for sensing the proximity of said magnets relative to said article upon downward movement of said carriage means, and control means responsive to said sensing means for interrupting downward movement of said carriage means upon engagement of said magnetic means with said article and initiating upward movement of said carriage means to lift said magnets and remove a single article from said stack.

4. A transfer apparatus according to claim 3 wherein said sensing means comprises a sensing plate mounted on said carriage means for vertical displacement relative thereto, said sensing plate having a lower portion engagable with said article prior to the engagement of said magnets therewith.

5. A transfer apparatus according to claim 4 including switch means mounted on said carriage means and responsive to movement of said sensing plate relative to said carriage means for energizing said control means.

6. A transfer apparatus according to claim 3 including means connecting said drive chains to said carriages, respectively, and shock absorbing means interposed between said carriages and said drive chains.

7. An article transfer apparatus comprising: an upright frame, means for supporting a stack of articles adjacent the lower end of said frame, a plurality of upright support rods rigidly secured to said frame, carriage means vertically slidable on said rods and disposed in vertical registry with said article supporting means, means for moving said carriage means toward and away from said article supporting means, said carriage means including support plates, a plurality of rigid members suspended from said support plates, at least one permanent magnet mounted on the lower end of each of said rigid members, means mounting said rigid members on said plates for pivotal movement relative to said support plates, means allowing generally bodily vertical displacement of said rigid members relative to said support plates whereby said magnets are self-orienting upon engagement thereof with an irregularly shaped article on said stack, means for sensing the proximity of said magnets relative to said article upon downward movement of said carriage means, said sensing means comprising a sensing plate mounted on said carriage means for vertical displacement relative thereto, said sensing plate having a lower portion engagable with said article prior to the engagement of said magnets therewith, there being at least one rigid shaft mounted on said carriage means and said sensing plate having an elongated slot for receiving said shaft whereby said sensing plate is vertically displaceable relative to said shaft upon engagement of said sensing plate with said article, and control means responsive to said sensing means for interrupting downward movement of said carriage means upon engagement of said magnetic means with said article and initiating upward movement of said carriage means to lift said magnets and remove a single article from said stack.

8. A transfer apparatus according to claim 7 including means on said rigid shaft for restraining lateral movement of said sensing plate on said rigid shaft.

* * * * *